US011523489B2

United States Patent
Zhu et al.

(10) Patent No.: US 11,523,489 B2
(45) Date of Patent: Dec. 6, 2022

(54) LASER PLASMA OPTICAL DEVICE AND METHOD FOR GENERATING ULTRA-SHORT ULTRA-INTENSE MID-INFRARED PULSES

(71) Applicant: Shanghai Jiao Tong University, Shanghai (CN)

(72) Inventors: Xinglong Zhu, Shanghai (CN); Suming Weng, Shanghai (CN); Min Chen, Shanghai (CN); Zhengming Sheng, Shanghai (CN); Jie Zhang, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 122 days.

(21) Appl. No.: 17/170,851

(22) Filed: Feb. 8, 2021

(65) Prior Publication Data

US 2021/0282254 A1 Sep. 9, 2021

(30) Foreign Application Priority Data

Mar. 4, 2020 (CN) .......................... 202010144114.9

(51) Int. Cl.
*H05G 2/00* (2006.01)
*H01S 3/00* (2006.01)

(52) U.S. Cl.
CPC ........... *H05G 2/008* (2013.01); *H01S 3/0085* (2013.01); *H05G 2/003* (2013.01)

(58) Field of Classification Search
CPC ......... A61B 18/14; A61B 18/40; A61B 18/42; A61B 18/203; A61B 18/1206; A61B 18/1477; H01J 35/00
See application file for complete search history.

(56) References Cited

U.S. PATENT DOCUMENTS

2017/0332468 A1* 11/2017 Milchberg ............. H05G 2/008
2020/0085388 A1* 3/2020 Fuchs ..................... A61B 6/40

OTHER PUBLICATIONS

A. Leblanc et al., "Plasma holograms for ultrahigh-intensity optics," Nature Physics, vol. 13, pp. 440-443, www.nature.com/naturephysics, published online:Jan. 16, 2017 | DOI: 10.1038/NPHYS4007.

(Continued)

*Primary Examiner* — David E Smith
*Assistant Examiner* — Hsien C Tsai
(74) *Attorney, Agent, or Firm* — Mei & Mark LLP; Manni Li

(57) ABSTRACT

Laser plasma optical device comprising a laser system for outputting driving light pulses and signal light pulses, a vacuum target chamber, a gas target generating device for generating gas and forming a required plasma channel target through high voltage capillary discharge ionization (or through laser picosecond pre-pulse ablation) of gas, and a focusing element. The driving light pulse is focused on the generated plasma channel target through the focusing element to generate a density-modulated plasma wake; and after a predetermined delay time T, the signal light pulse is focused onto a leading edge region of a second plasma density cavitation bubble of the plasma wake through the focusing element, so that the frequency of the signal light pulse is red-shifted to generate an ultra-intense near-single-cycle mid-infrared pulse.

10 Claims, 3 Drawing Sheets

(56) References Cited

OTHER PUBLICATIONS

Zan Nie et al., "Relativistic single-cycle tunable infrared pulses generated from a tailored plasma density structure," Nature Photonics, vol. 12, pp. 489-494 (Aug. 2018).

C. Thaury et al., "Plasmamirrors for ultrahigh-intensity optics," Nature Physics, vol. 3, pp. 424-429 (Jun. 2007).

F. S. Tsung et al., "Generation of ultra-intense single-cycle laser pulses by using photon deceleration," PNAS, vol. 99, No. 1, pp. 29-32 (Jan. 8, 2002).

Suming Weng et al., "Extreme case of Faraday effect: magnetic splitting of ultrashort laser pulses in plasmas," Optica, vol. 4, No. 9, pp. 1086-1091 (Sep. 2017).

\* cited by examiner

LASER PLASMA OPTICAL DEVICE AND METHOD FOR GENERATING ULTRA-SHORT ULTRA-INTENSE MID-INFRARED PULSES

CROSS-REFERENCE TO RELATED APPLICATIONS

The subject application claims priority on Chinese Application No. CN202010144114.9 filed on Mar. 4, 2020 in China. The contents and subject matter of the Chinese priority application is incorporated herein by reference.

TECHNICAL FIELD

The present invention relates to laser plasma physics and non-linear optics, in particular, a plasma optical device driven by ultra-short pulse intense laser and method for generating a near-single-cycle mid-infrared pulse with relativistic intensity and single-pulse energy up to multi-millijoule.

BACKGROUND ART

Mid-infrared band (3-20 μm) laser pulse has important application in basic scientific research, biomedical application, precision manufacturing, etc. As the spectrum at the wave band covers many characteristic oscillation modes of organic molecules and thus generates characteristic oscillation absorption spectra, it has unique capability in diagnostic identification and manipulation research. In particular, the generation of ultra-short and ultra-intense mid-infrared laser pulses has brought important research tools for scientific research, for example, in realizing ultra-high subharmonic radiation, high energy attosecond (1 attosecond=$10^{-18}$ seconds) pulses, multi-dimensional infrared spectroscopy, ultra-fast dynamic imaging, and particle acceleration.

At present, the method for generating ultra-short and ultra-intense mid-infrared light pulses is mainly based on the traditional nonlinear crystalline materials technology. However, due to the limitations of the frequency bandwidth, damage threshold, and energy gain of the crystalline material, it is difficult to generate fewer-cycle mid-infrared light pulses with multi-millijoule (1 millijoule=$10^{-3}$ Joules) and high intensity. As the number of the optical cycle decreases and wavelength increases, the generation of fewer-cycle infrared light pulses with high intensity and high energy becomes more challenging, which has become one of the difficulties in current photophysics. Currently, near-single-cycle mid-infrared pulse energy obtained based on crystalline materials optics is typically limited to tens of microjoules (1 micro-joule=$10^{-6}$ joules) with peak intensity ($I_o$) within the order of terawatts per square centimeter ($10^{12}$ W/cm$^2$), which greatly limits their research capabilities and application range. When the driving light field has longer wavelength ($\lambda$), higher light intensity, shorter oscillation period, and higher pulse energy, its research and application capability is greatly enhanced, for example, a brighter and shorter femtosecond pulse light source can be generated by utilizing the interaction of the light pulse and gas atoms, and the resulting photon energy (proportional to the product $I_0\lambda^2$ of the intensity and the square of the wavelength) is extended to a hard X-ray energy range. In addition, when the peak intensity of the driving light field reaches a relativistic intensity ($I_0 \sim (1/\lambda^2[\mu m]) \times 10^{18}$ W/cm$^2$), it may open up the relativistic nonlinear optics in the mid-infrared optical band and bring unprecedented exploration ability and opportunity for scientific research. Previously, the chirped pulse amplification technique invented by Donna Strickland and Gerard Mourou in 1985 significantly enhanced the laser intensity in the near-infrared band (laser wavelength around 1 micrometer) (over $10^{18}$ watts per square centimeter), making the first time achieving a relativistic intense region of laser intensity. The technology has revolutionized laser physics and technology science, opened the field of nonlinear optics, and brought important research value for many scientific research. To date, relativistic nonlinear optics has been mainly limited to the near infrared band.

In recent years, research on the generation of new radiation sources based on laser plasma optics has received extensive attention and development. In contrast to conventional optical crystalline materials, plasma as a carrier medium can withstand laser pulses of extremely high power, intensity, and energy, thereby being suitable for controlling and generating high intensity light pulses and high energy radiation sources. At present, based on laser plasma optical methods, researchers have researched and developed mechanisms that can generate light sources of various wave bands, for example, ultra-short and ultra-intense mid-infrared pulses can be generated by self-modulation and self-compression effects of ultra-high power relativistic intense laser pulses in plasma. However, the mid-infrared pulses generated by pulse self-modulation and self-compression are a continuous ultra-wide spectrum with very low efficiency (typically less than a few percent) and poor spectral tunability. In addition, the hundred-terawatts-order power incident laser pulses and Joules-order single pulses are required, which will require large, expensive laser devices. At present, only some large and medium laboratories have such laser devices with a repetition frequency of only a few Hertz and relatively poor stability, which greatly limits the practical use, application value, and scope of the scheme.

Therefore, there is an urgent need in the art to develop an efficient, small-size, and compact optical device with high repetition frequency, which generates multi-millijoule fewer-cycle mid-infrared light pulses with stable relativistic intensity, tunable spectral, and other pulse parameters.

SUMMARY OF THE INVENTION

The present invention provides a laser plasma optical device for generating ultra-short and ultra-intense, i.e., relativistic intensity, multi-millijoule, near-single-cycle, mid-infrared light pulses with tunable spectral and other pulse parameters.

The present invention provides a laser plasma optical device comprising a laser system for outputting driving light pulses and signal light pulses; a vacuum target chamber for providing a vacuum environment for interaction of laser and matter; a gas target generating device disposed in the vacuum target chamber, the gas target generating device being used for generating gas and forming a plasma channel target along a propagation direction of a driving light pulse by a laser pre-pulse irradiation or by a high-pressure ionized gas; and a focusing element disposed in the vacuum target chamber, wherein the driving light pulse is focused onto the plasma channel target by the focusing element to generate a density-modulated plasma wake; after a predetermined delay time T, the signal light pulse is focused onto a leading edge region of a second plasma density cavitation bubble of the density-modulated plasma wake through the focusing element, so that frequency of the signal light pulse is red-shifted to generate a near-single-cycle mid-infrared pulse with relativistic intensity and single-pulse energy up to multi-millijoule.

Preferably, the plasma channel target has a density-rising radial density gradient distribution in a radial direction of the channel, i.e., in a direction outward from the optical axis or the center axis of the channel, and a substantially uniform axial density distribution in an axial direction of the channel.

Preferably, the direction of the driving light pulses is the same as that of the signal light pulses.

Preferably, the propagation direction of the driving light pulses is the same as that of the signal light pulses and the laser pre-pulses.

Preferably, the leading edge region is within the most front end or first ½ region of the second plasma cavitation bubble of the plasma wake.

Preferably, the laser pre-pulse and the driving light pulse are the same laser pulse, wherein a leading edge or a leading segment of the laser pulse is used as the pre-pulse and a lagging segment (main pulse) of the laser pulse is used as the driving light pulse.

Preferably, the driving light pulse and signal light pulses are focused onto the plasma target with a beam waist radius of 5-30 micrometers.

Preferably, the laser pulses (driving light pulses and signal light pulses) are focused onto the gas target with a beam waist radius of 8-15 micrometers.

Preferably, the pulse width of the driving light pulse is 10-60 femtoseconds, and more preferably, 20-40 femtoseconds.

Preferably, the signal light pulses have a pulse width of 5-30 femtoseconds, and more preferably, 10-20 femtoseconds.

Preferably, the predetermined delay time T can be adjusted in the range of tens of femtoseconds.

Preferably, the peak power of the driving light pulses is 1-20 terawatts, and more preferably, 3-9 terawatts.

Preferably, the peak power of the signal light pulses is 0.1-15 terawatts, and more preferably, 0.5-7 terawatts.

Preferably, the gas target generating device is a controllable high pressure gas nozzle device or capillary channel device.

Preferably, the high pressure gas nozzle means ejects gas with controllable density and volume and is ionized by interacting with picosecond pre-pulse to generate a plasma channel target having a parabolic density gradient in the radial direction (rising outward from the optical axis) that is substantially uniform in the axial direction.

Preferably, the capillary channel device is generated by filling the capillary tube with gas from the gas generating device and then ionizing the gas in the tube by high voltage electricity supplied from an electrode device, thus creating a plasma channel target having a parabolic density gradient in the radial direction (rising outward from the optical axis) that is substantially uniform in the axial direction.

Preferably, the generated plasma channel target has a length of 800-3000 micrometers, preferably 1200-2000 micrometers in the laser propagation direction.

Preferably, the gas composition used to form the gas target is composed of a mixed gas of hydrogen, helium, nitrogen, or a combination thereof.

Preferably, the plasma channel target has a parabolic-like density gradient in the transverse direction (perpendicular to the direction of laser propagation) (i.e., a low density in the central region and a high density in the outer region), which can effectively guide the transmission of laser pulses over long distances.

Preferably, the plasma channel target has an electron number density of $10^{17}$-$10^{20}$ per cubic centimeter, preferably $10^{18}$-$10^{19}$ per cubic centimeter.

Preferably, the parameters of the generated mid-infrared light pulse can be regulated and controlled by adjusting the parameters of the plasma channel target, the signal light pulse, or the driving light pulse.

Preferably, the laser plasma optical device further comprises a control system for controlling the laser system, the gas target generating device and the focusing element.

Preferably, the control system comprises a delay control by which the signal light pulse is injected into the leading region of the second plasma density cavitation bubble of the plasma wake.

Preferably, the mid-infrared pulse has one or more characteristics selected from the group consisting of (a) a peak intensity exceeding $10^{17}$ watts/cm$^2$; (b) a pulse width being short to near a single optical cycle at the half-height full width position of the light intensity; (c) total energy up to dozens of millijoules; (d) a central wavelength up to 5 micrometers, and the maximum cut-off wavelength up to 10 micrometers; and (e) a controllable carrier phase.

The present invention further provides a method for generating a near-single-cycle mid-infrared pulse with relativistic intensity and single-pulse energy up to multi-millijoule, which comprises the steps of:

(a) providing a gas target which generates a plasma channel target through laser pre-pulse irradiation or by high-pressure ionization of the gas target;

(b) providing a driving light pulse which is focused onto the gas target or the plasma channel target formed by the gas target in step (a), thereby generating a density-modulated plasma wake;

(c) and after a predetermined delay time T, providing a signal light pulse which is focused onto the leading edge region of the second plasma density cavitation bubble of the plasma wake in step (b), so that the frequency of the signal light pulse is red-shifted to generate a near-single-cycle mid-infrared pulse with relativistic intensity and single-pulse energy up to multi-millijoule.

Figure 1:
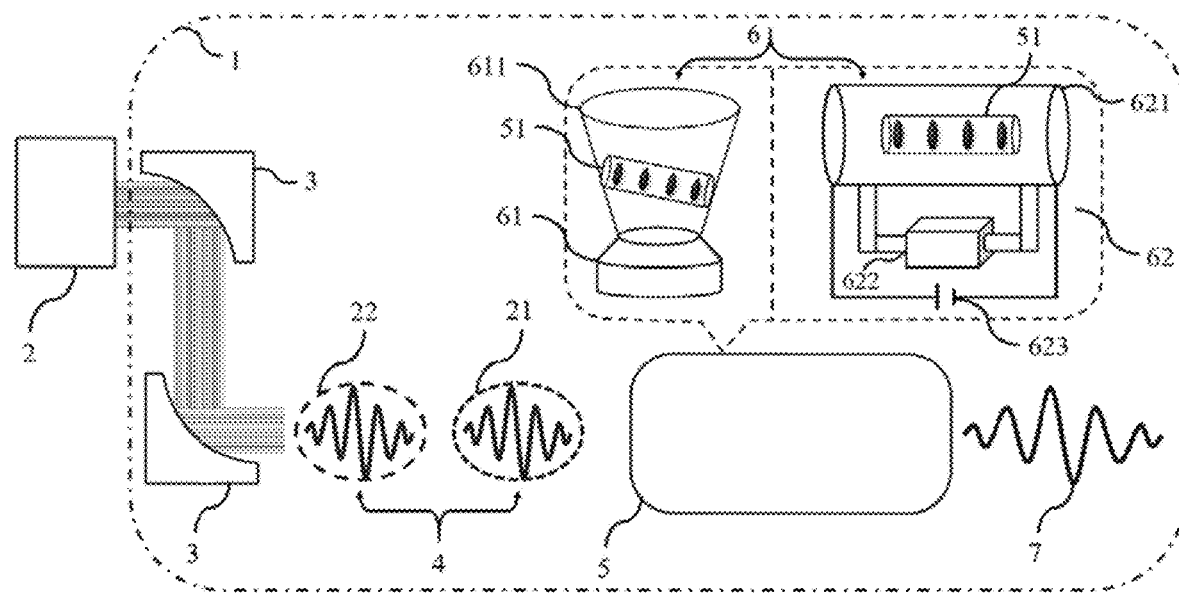
FIG. 1 shows the structure of the device for generating ultra-short and ultra-intense mid-infrared pulses in the present invention.

Reference numerals in the drawings refer to the following structure: 1—vacuum target chamber; 2—laser/terawatt-order laser device; 21—driving light pulses; 22—signal light pulses; 3—focusing element/focusing parabolic lens; 4—delay control; 5—plasma channel target; 51—laser plasma wake; 6—gas target generating device; 61—high-pressure gas nozzle device; 611—gas; 62—capillary channel device; 621—capillary tube; 622—gas generating device; 623—high voltage power supply; 7—mid-infrared pulses; 81—modulated driving light pulses; 82—modulated signal light pulses; 5—plasma channel target; 511—first cavitation bubble of the plasma wake; 512—second cavitation bubble of the plasma wake.

DETAILED DESCRIPTION OF THE INVENTION

The laser plasma optical device and method for generating a near-single-cycle mid-infrared pulse of the present invention has relativistic intensity and single-pulse energy up to multi-millijoule; compared with the traditional optical technology method, the laser plasma optical method has a plurality of unique advantages and can generate ultra-short and ultra-intense mid-infrared pulses. With the advantages of high efficiency, small size and compactness, and high repetition frequency, the device of the present invention provides relativistic intense, multi-millijoule, near-single-cycle, ultra-short and ultra-intense mid-infrared light pulses with economical practicability and reliability, which not only is unattainable by the traditional optical device at present, but also breaks through the bottleneck of the traditional optical technology, and has potential wide application values for basic scientific research, medical and industrial applications. In addition, the conditions required by the method of the present invention are relatively simple, easy to implement, economical and practical, and there is a possibility of realizing high operating repetition frequency.

The present invention provides a laser plasma optical device (a device for generating ultra-short and ultra-intense mid-infrared pulses) and a method for generating near-single-cycle mid-infrared light pulses with relativistic intensity and single pulse energy up to multi-millijoule. According to the method of the present invention, the ultra-short driving laser pulse with the center wavelength of about 0.8-1.0 micrometers of the relativistic intensity of the terawatt-order (1 terawatt=$10^{12}$ W) is transmitted in the thin plasma, and the signal laser pulse with the center wavelength of about 0.8-1.0 micrometers is modulated through the plasma electron density disturbance wake generated by the ultra-short driving laser pulse, and is converted into mid-infrared light pulses having a wavelength above 4 micrometers.

Implementation of the present invention requires a terawatt laser system and a vacuum target chamber where an adjustable high pressure gas nozzle device or capillary channel device is disposed for generating a plasma channel target with adjustable density and length. The laser system may employ a commercially available small-sized kilohertz-order femtosecond short pulse laser device. The pulse output by the device is divided into two laser pulses which are transmitted in the same direction, wherein the front pulse serves as a driving light pulse, and the rear pulse serves as a signal light pulse. The driving light pulse firstly interacts with a plasma channel target to generate a nonlinear plasma wake with a density cavitation bubble structure. By adjusting and controlling the time delay between the signal light pulse and the driving light pulse, the signal light pulse is injected into the leading edge region of the second plasma density cavitation bubble of the plasma wake generated by the driving light pulse, so that an intense frequency redshift effect occurs. After sufficient interaction and modulation, the signal light pulse is effectively converted into few-cycle mid-infrared pulse with energy up to multi-millijoule. The output mid-infrared pulse parameters, including its pulse energy, center frequency, spectral width, etc., are modulated by varying the parameters of the driving laser pulse, signal laser pulse, or plasma channel target.

Compared with the traditional technical method, the method of the present invention has the main advantages. Due to the limitation of frequency bandwidth, damage threshold, energy gain and so on, it is difficult to generate multi-millijoule few-cycle mid-infrared light pulses with high intensity based on traditional nonlinear crystalline materials. Currently, the energy of near-single-cycle mid-infrared pulse energies obtained based on crystalline materials optics technology is typically limited to tens of microjoules with peak intensity on the order of about terawatts per square centimeter. Based on the laser plasma optical method of the present invention, as there is no material loss threshold and other restrictions, the plasma can withstand laser pulses with extremely high power, intensity and energy, and is suitable for controlling and generating light pulses with high power, high energy, and high intensity. In addition, the generated mid-infrared pulse parameters can be conveniently regulated and controlled by simply changing plasma parameters or incident laser pulses.

Compared with other laser plasma methods, the method of the present invention has major advantages. Previously, the ultra-short and ultra-intense mid-infrared pulses are generated by self-modulation and self-compression of ultra-high power relativistic intense laser pulses in plasma, however, the mid-infrared pulses generated by the method are a continuous ultra-wide spectrum with very low efficiency (typically less than a few percent) and poor spectral tunability. In addition, large and expensive laser devices with hundred-terawatts-order powder and Joules-order energy are required. At present, only some medium and large laboratories have such laser with very low operating repetition frequency, typically only a few Hertz, and relatively poor stability. These greatly limit the practical use and application value of the mechanism scheme. The laser system required by the present invention employs the conventional commercial terawatt-order laser, which is smaller in size, economical and practical, and has higher stability and kilohertz-order repetition frequency so that the generated mid-infrared pulse is more convenient, stable, and reliable, thereby being more practical and wider in application ranges. In addition, the mid-infrared pulse efficiency converted by the method can reach about thirty percent of the incident signal light pulse energy and has adjustable wavelength and other pulse parameters.

Therefore, the present invention generates relativistic intense, multi-millijoule and few-cycle mid-infrared pulses with high repetition frequency and high-efficiency. The method of the present invention is superior to and different from the mid-infrared pulse obtained by self-modulation of the ultra-high power pulse in the plasma provided by others, and simultaneously breaks through the capability of the optical technology based on the nonlinear crystalline materials at present, which will bring economical, practical, stable, and reliable ultra-intense few-cycle mid-infrared light source to a wide range of scientific groups.

The present invention is explained in further details below. The claimed technical invention may be practiced with various changes and modifications to the following embodiments without departing from the scope of protection of the present invention.

As used herein, "laser plasma optics device" and "device for generating ultra-short ultra-intense mid-infrared pulses" are used interchangeably.

In addition, terms "include", "comprise", or any other variations thereof are intended to cover non-exclusive including, so that a process, a method, an article, or a device including a series of elements not only includes those elements, but also includes other elements that are not explicitly listed, or also includes inherent elements of the process, the method, the article, or the device. Without more restrictions, the elements defined by the sentence "including a . . . " do not exclude the existence of other identical elements in the process, method, article, or device including the elements.

In the present invention, all the directional indications (such as upper, lower, left, right, front, back, etc.) in the examples of the present invention are merely used to explain a relative position relationship, motion situations, and the like of the components in a specific gesture (as shown in the figures). If the specific gesture changes, the directivity indication also changes accordingly.

In the present invention, a laser plasma optical device based on laser driving comprises a terawatt femtosecond laser system, a vacuum target chamber, a gas target generating device, a focusing element, and a control system, wherein the vacuum target chamber may provide a vacuum environment for interaction of laser and matter; the gas target generating device is disposed in the vacuum target chamber, wherein the gas target generating device is used for generating gas and forming a plasma channel target along a driving light pulse propagation direction by laser pre-pulse irradiation or by high-pressure ionized gas; and the focusing element is disposed in the vacuum target chamber, wherein the driving light pulse is focused onto the generated plasma channel target by the focusing element, thereby generating a density-modulated plasma wake; and after a predetermined delay time T, the signal light pulse is focused onto the leading edge region of the second plasma density cavitation bubble of the plasma wake through the focusing element, so that the frequency of the signal light pulse is red-shifted to generate a near-single-cycle mid-infrared pulse with relativistic intensity and single-pulse energy up to multi-millijoule.

In the present invention, the control system is used for controlling the laser system, the gas target generating device and the focusing element. Preferably, the control system comprises a time delay control by which the signal light pulse is injected into the leading region of the second plasma density bubble of the plasma wake.

In the present invention, a laser system includes a laser and associated optical path device, wherein the laser can employ a high repetition frequency (kilohertz-order) laser device which is commercially available at present and is stable, economical and practical, for generating driving optical pulses, signal optical pulses, and controllable laser pre-pulses with appropriate parameters.

In the present invention, the laser pre-pulse is a leading portion of a laser pulse, and the main pulse of the laser pulse is a driving light pulse or a signal light pulse. In the experiments, elements such as plasma mirrors can be used to eliminate or retain the laser pre-pulse.

In the present invention, the driving light pulse and the signal light pulse are both common Gaussian beams. The variation of the signal light pulse or the driving light pulse parameter can be used for regulating and controlling the parameter of the generated mid-infrared light pulse.

The beam waist radius at which the drive and signal light pulses are focused on the target is 5-30 micrometers, and preferably 8-15 micrometers. The pulse width of the driving light pulse is 10-60 femtoseconds, and preferably 20-40 femtoseconds. The pulse width of the signal light pulse is 5-30 femtoseconds, and preferably 10-20 femtoseconds. The signal light pulse and the driving light pulse may have the same pulse width, i.e., one output laser pulse is divided into two laser pulses with a certain time delay.

The peak power of the driving light pulse is 1-20 terawatts, and preferably 3-9 terawatts; the peak power of the signal light pulses is 0.1-15 terawatts, and preferably 0.5-7 terawatts.

By controlling the time delay, the signal light pulse is located at the leading edge region of the second plasma density cavitation bubble of the wake generated by the driving light pulse, so that an intense frequency redshift effect occurs, and then the signal light pulse is converted into a mid-infrared pulse.

In the present invention, a gas target is formed along a driving light pulse propagation direction by laser pre-pulse irradiation or by high-pressure ionized gas; the gas target may be generated by a method such as, but not limited to, a high pressure gas nozzle device or a capillary channel. The formed plasma channel target has the adjustability of density and length and is suitable for high repetition frequency. The changes in the plasma channel target parameters can be used to regulate and control the parameters of the generated mid-infrared light pulses.

In the present invention, the gas may consist of a pure gas of low atomic number or a mixture of gases, preferably hydrogen, helium, nitrogen or a mixture thereof.

In the present invention, the plasma formed through capillary ionization (or laser pre-pulse ablation) contains an electron number density of $10^{17}$-$10^{20}$ per cubic centimeter, preferably $10^{18}$-$10^{19}$ per cubic centimeter.

In the present invention, the length of the plasma channel target in the laser propagation direction is 800-3000 micrometer, preferably 1200-2000 micrometer.

In the present invention, the plasma channel target has a parabolic-like density gradient in the transverse direction (perpendicular to the laser propagation direction), which can effectively guide the transmission of laser pulses over long distances.

In the present invention, the high-pressure gas nozzle device can generate a desired gas target by regulating and controlling the shape of the gas nozzle outlet and the jet flow rate. In addition, the gas target can be ablated by a picosecond pre-pulse of the laser to form a parabolic-like distributed plasma channel target with a low center density and a high outer density.

In the present invention, the capillary channel device is composed of a capillary tube, a gas generating device and a high voltage power supply. An appropriate gas is filled into the capillary tube through a gas generating device, and then the gas in the tube is ionized through high-voltage discharge provided by a power supply, so that a parabolic-like distributed plasma channel target with uniform density along the axial direction of the tube, low radial center density and high outer side density is generated. In addition, the parameters of the generated plasma channel can be regulated and controlled by changing the shape of the capillary, the amount of filled gas, and the supply voltage, so that the desired target is generated.

In the present invention, the method for generating a near-single-cycle mid-infrared pulse with relativistic intensity and single-pulse energy up to multi-millijoule comprises the steps of:

(a) providing a gas target which generates a plasma channel target through laser pre-pulse irradiation or by high-pressure ionization of the gas target;

(b) providing a driving light pulse which is focused onto the gas target or the plasma channel target formed by the gas target in step (a), thereby generating a density-modulated plasma wake; and (c) after a predetermined delay time T, providing a signal light pulse which is focused onto the leading edge region of the second plasma density cavitation bubble of the plasma wake in step (b), so that the frequency of the signal light pulse is red-shifted to generate a near-single-cycle mid-infrared pulse with relativistic intensity and single-pulse energy up to multi-millijoule.

In the present invention, the generated adjustable ultra-short and ultra-intense mid-infrared pulse has the following characteristics:

(a) an ultra-high light intensity, with peak intensity over $10^{17}$ watts/cm$^2$;

(b) an ultra-short pulse cycle number, with the pulse width being as short as nearly a single optical cycle at the half-height full width of the light intensity;

(c) an ultra-high pulse energy, with total energy up to dozens of millijoules;

(d) a long carrier wavelength, with the center wavelength up to 5 micrometers, and the maximum cut-off wavelength up to 10 micrometers; and (e) a controllable carrier phase.

Detailed embodiments of the present invention are described in detail with reference to the drawings. The present invention is not limited to the embodiments shown in the drawings, and a person skilled in the art can understand the present invention from the substantial spirit embodied in the following description of the scheme.

As shown in FIG. 1, the device for generating ultra-short and ultra-intense mid-infrared pulses of the present invention. comprises a laser 2 and a vacuum target chamber 1 and a plasma channel target 5. A vacuum target chamber is used to provide a vacuum environment for interaction of laser and matter. In addition, a controllable high-pressure gas nozzle device 61 or capillary channel device 62 is disposed in the vacuum target chamber for generating an adjustable plasma channel target 5. The generated plasma channel target has the adjustability of density and length and has high recycling rate.

The high-pressure gas nozzle device 61 can control the emitted gas 611 by adjusting the shape of the gas nozzle outlet and the jet flow rate. The gas is ablated by a laser picosecond pre-pulse (not shown in the figures) to form a parabolic-like distributed plasma channel with a low center density and a high outer density, i.e., the desired plasma channel target 5.

The capillary channel device 62 is composed of a capillary tube 621, a gas generating device 622, and a high voltage power supply 623. An appropriate gas is filled into the capillary tube through a gas generating device, and then the gas in the tube is ionized through high-voltage discharge provided by a power supply, so that a parabolic-like distributed plasma channel target with uniform density along the axial direction of the tube, low radial center density and high outer side density is generated. In addition, the parameters of the generated plasma channel can be regulated and controlled by changing the shape of the capillary, the amount of filled gas, and the supply voltage, so that the desired target is generated 5.

The length of the generated plasma channel target 5 in the laser propagation direction is preferably 1200-2000 micrometers and can efficiently guide the laser for long-distance transmission as it has a parabolic-like density gradient in the lateral direction. The plasma channel density formed is preferably $n_e=n_0+\Delta n_0$, wherein $n_0$ is the on-axis electron number density, $\Delta n_0 = \lambda^2 r^2 n_c/\pi^2 w^4$ is the channel characteristic density gradient, $n_c = m_e \omega^2/4\pi e^2$ is the plasma electron critical density, $\lambda$ is the incident laser wavelength, $\omega$ is the incident laser frequency, w is the incident laser focal spot radius, $m_e$ is the electron rest mass, e is the electron unit charge amount, and r is the distance radius from the plasma channel axis. The composition of the gas target may consist of a single or multiple mixed gases of low atomic number, preferably hydrogen, helium, nitrogen or mixtures thereof. The desired plasma channel target is generated through capillary high voltage discharge ionization (or laser picosecond pre-pulse ablation) of the gas target, with the electrons number density contained therein preferably $10^{18}$-$10^{19}$ per cubic centimeter.

Figure 2:
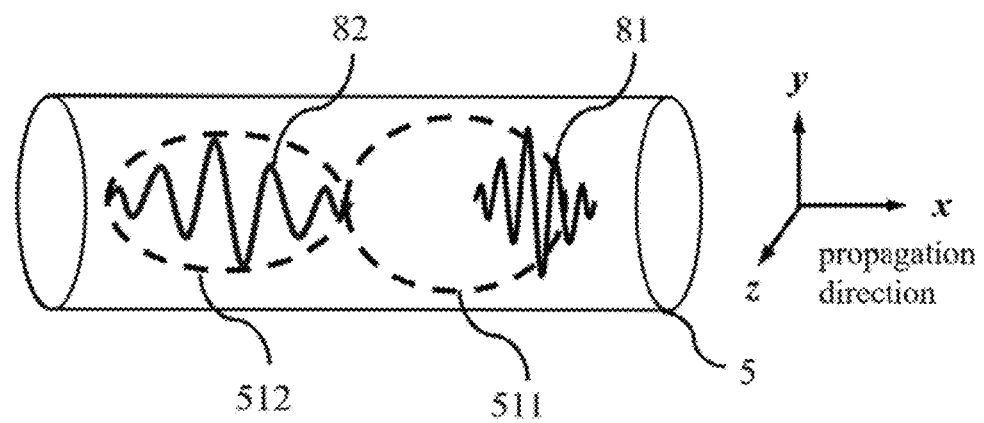
FIG. 2 shows the structure of the laser plasma wake and modulated laser pulses in the present invention.

The laser 2 is used for outputting a driving light pulse 21 and a signal light pulse 22, wherein the driving light pulse firstly interacts with the plasma channel target 5 to generate a plasma wake 51 with a spatial structure presenting density cavitation bubble. Then, the signal light pulse 22 with a certain time delay is injected into the density rising region of the second density cavitation bubble behind the driving light pulse as shown in FIG. 2, and an intense optical frequency red-shift effect is excited through modulation of the signal laser pulse by this density distribution, resulting in a few-cycle ultra-intense mid-infrared pulse, i.e., a modulated signal light pulse (7 in FIG. 1 or 82 in FIG. 2). The laser can employ a kilohertz-order laser device 2 which is commercially available at present and is stable, economical, and practical.

Both the driving light pulse 21 and the signal light pulse 22 are conventional Gaussian beams. The focused beam is focused on the target through a focusing parabolic lens (focusing element 3), with the beam waist radius preferably 8-15 micrometers. The pulse width of the driving light pulse 21 is preferably 20-40 femtoseconds; and the peak power is preferably 3-9 terawatts. The signal light pulses 22 are focused onto the target in the same direction by a certain time delay control 4, the pulse width of the signal laser is preferably 10-20 femtoseconds, and the peak power is preferably 0.5-7 terawatts. The delay time is approximately 50-80 femtoseconds (comparable to the longitudinal length of the generated first plasma cavitation bubble (511 in FIG. 2)), so that the injected signal light pulse is locate in the density rising region at the leading edge of the second plasma cavitation bubble (512 in FIG. 2) in the wake, resulting in an intense frequency red-shift effect. After the modulation by sufficient interaction, the signal light is efficiently converted into long wavelength mid-infrared pulses 82.

Figure 3:
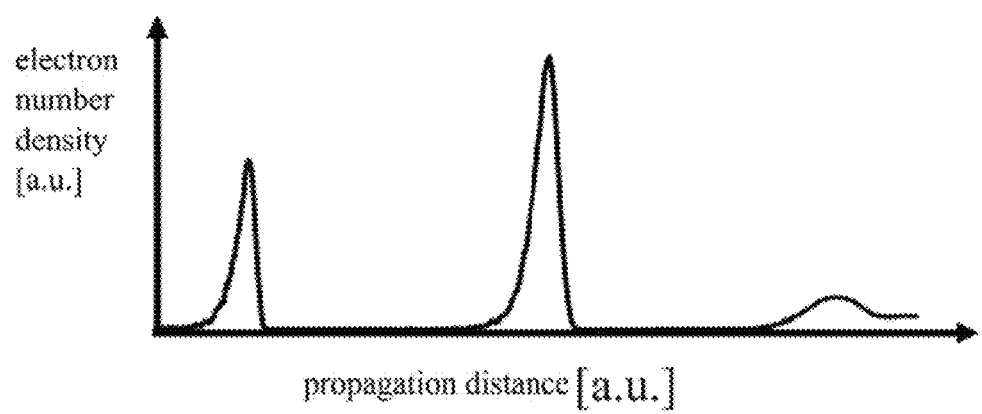
FIG. 3 is a diagram showing the distribution of on-axis electron number density of the plasma wake in the present invention.

The schematic diagram of the laser plasma wake, the modulated signal light pulse (82, i.e., mid-infrared pulse 7), and the driving light pulse (81) are shown in FIG. 2, and the on-axis density distribution of the plasma wake is shown in FIG. 3. The driving light pulses are mainly used for generating a density-perturbed wake by interaction with the plasma, which contains a plurality of plasma cavitation bubble. As the driving laser pulse itself is located in a region where the density disturbance is very mild (i.e., the leading edge of the first plasma cavitation bubble 511), though the legging edge portion of the driving laser pulse is also in the density rising region, it is difficult to generate a frequency red shift phenomenon, which is a pulse self-modulation mechanism. Therefore, the previous schemes based on pulse self-modulation all require a hundred-terawatt, Joule-order intense laser pulse to excite an intense density-perturbed wake to generate ultra-intense mid-infrared pulses. In addition, according to the self-modulation method, only a small part of laser pulse energy is converted into mid-infrared pulses, most of the energy will be absorbed by plasma to form a wakefield or generating high-energy electrons through acceleration, and the leading edge portion of the pulses is located in a density gradient descent region and cannot be converted into mid-infrared pulses. Thus, the conversion efficiency of pulse self-modulation methods is typically less than a few percent. In the present invention, since the signal light is located in a very high density rising region (i.e., the leading edge of the second plasma cavitation bubble 512), an intense frequency redshift phenomenon will occur. Since the density-perturbed wake is generated by the driving laser, it does not need to consume much signal light energy. The consumed signal laser energy primarily enhances the wake of the second plasma cavitation bubble in which it resides and is partially absorbed by the plasma, and the enhanced plasma wake in turn enhances the frequency red-shift effect. Thus, the signal laser can achieve fast and efficient frequency red-shift conversion, thereby generating ultra-short and ultra-intense mid-infrared pulses 82.

In addition, the parameters of the generated mid-infrared pulse, such as pulse energy, peak intensity, wavelength, carrier phase, oscillation period number etc., can be regulated and controlled by changing the parameters of the plasma channel target 5, the signal light pulse 22 or the driving light pulse 21, thereby realizing an adjustable relativistic intense, multi-millijoule and near-single-cycle mid-infrared light pulse.

The present invention is further described below with reference to Example 1. The example is only used to describe the present invention and are not intended to limit the scope of the present invention. The experimental methods in the following examples which are not specified with specific conditions are generally carried out according to conventional conditions or according to the conditions recommended by the manufacturer.

Example 1

The embodiment of the device of the present invention as shown in FIG. 1 is used, including a laser, a vacuum target chamber, a focusing element, and a plasma channel target.

The laser provides a driving light pulse and a signal light pulse, where both the driving light pulse and the signal light pulse are Gaussian beams with the same wavelength of 1 micrometer and the same focusing focal spot radius of 8 micrometers, different peak intensity ($5.5 \times 10^{18}$ watts per square centimetre for the driving laser and $1.4 \times 10^{18}$ watts per square centimetre for the signal laser), different pulse widths (33.3 femtoseconds for the driving laser and 13.3 femtoseconds for the signal laser), and different peak powers (5.5 terawatts for the driving laser and 1.4 terawatts for the signal laser).

The vacuum target chamber is used to provide a vacuum environment for interaction of laser and matter.

The plasma channel generated through capillary high voltage discharge ionization (or laser picosecond pre-pulse ablation) of the gas target preferably has a length of about 1600 micrometers in the laser propagation direction, with a parabolic-like density distribution (low center density and high outer density). The adopted gas is hydrogen, and the electron number density of the ionized plasma along the channel axis is about $4 \times 10^{18}$ per cubic centimeter; the radial density gradually increases according to the channel characteristic density gradient ($\Delta n_0 = \lambda^2 r^2 n_c / \pi^2 w^4$), for example, the density at the focal spot (w=8 micrometers) is about $6 \times 10^{18}$ per cubic centimeter.

The driving light pulse first interacts with the plasma channel target to excite a plasma wake that generated a density perturbation as shown in FIG. 2. Subsequently, a signal light pulse with a delay of about 70 femtoseconds is focused onto the plasma target in the same direction, so that it is injected into the second plasma cavitation bubble leading edge in the wake. Since the signal laser pulse is in the high density-disturbance steep density rising region, an intense frequency redshift effect occurs. After being fully modulated, the signal light is effectively converted into ultra-short and ultra-intense mid-infrared pulses.

Figure 4:
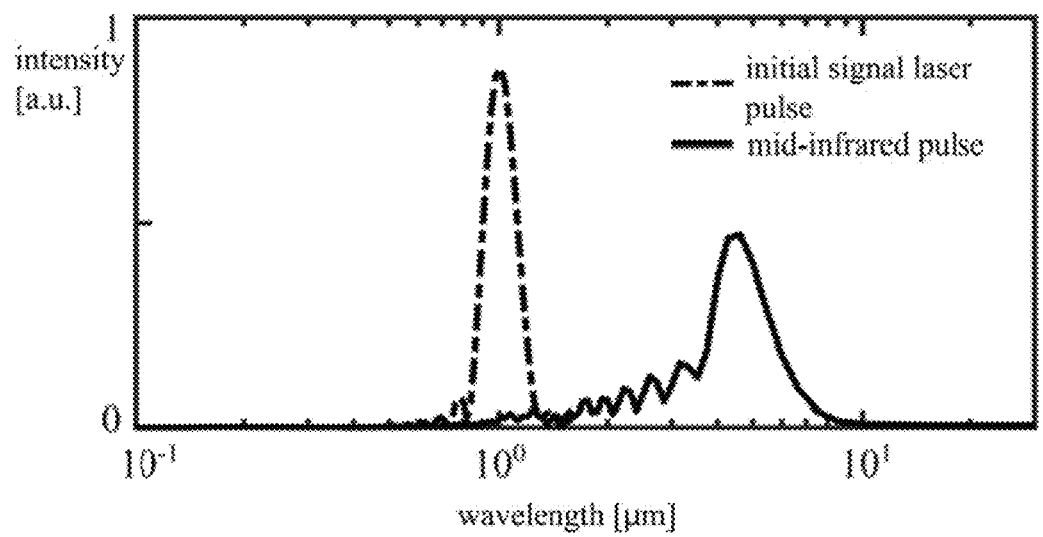
FIG. 4 is a diagram showing the spectral distribution of the initial signal light pulse and the modulated mid-infrared light pulse in the present invention.
Figure 5:
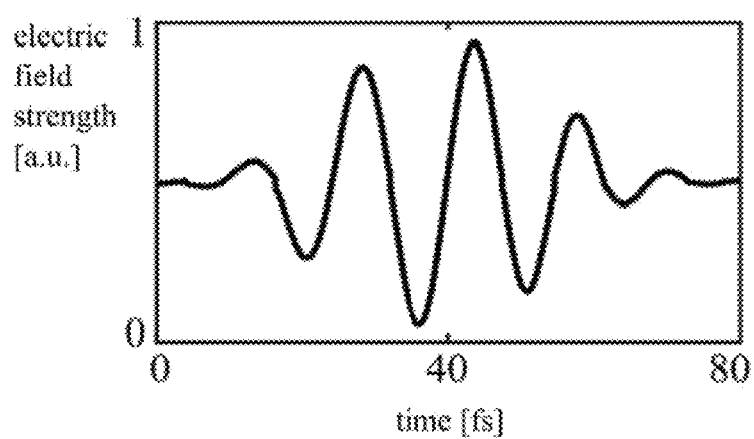
FIG. 5 is a diagram showing the electric field distribution of the mid-infrared light pulse at a spectral peak wavelength of about 4.5 micrometers in the present invention.

The distribution of the initial spectrum and the modulated spectrum of the signal light pulse is shown in FIG. 4; and the electric field distribution of the mid-infrared pulse at a spectral peak wavelength of about 4.5 micrometers is shown in FIG. 5. The numerical simulation results show that the signal light pulse is effectively converted into a long wavelength mid-infrared pulse, and the half-height full width of the generated mid-infrared pulse width is as short as a single optical cycle. In addition, the parameters of the generated mid-infrared pulse are further adjusted by changing the parameters of initial plasma target.

The laser plasma optical device and method for generating relativistic intense multi-millijoule near-single-cycle mid-infrared pulse of the present invention have advantages:

(a) simple and compact device at low cost: the laser device required by the present invention employs currently commercially available terawatt-order compact laser having a kilohertz-order operating repetition frequency, compact size, and low purchase and operating costs. The vacuum target chamber with mature equipment technology can be ordered directly from the manufacturer; also, the mature nozzle or capillary device technology for generating gas targets has been widely used in experiments such as laser plasma acceleration;

(b) generation of efficient, ultra-intense and ultra-short mid-infrared pulses: few-cycle mid-infrared pulses generated based on nonlinear crystalline materials technology are generally limited to low light intensity (non-relativistic intensity) and low energy (microjoule-order); by using the method of the present invention, high-efficiency relativistic intense, multi-millijoule and near-single-cycle mid-infrared pulses can be realized, which breaks through the limitation of the traditional optical technology method;

(c) simple operation and high repetition frequency: the method only needs to focus the driving light pulse and the signal light pulse on the generated gas target according to the set time delay. The frequency red-shift modulation spontaneously excited by the interaction of the laser and the plasma generates ultra-short and super-intense mid-infrared pulses without other optical modulation equipment, so it is a simple all-optical generation method. The laser has a kilohertz-order operating repetition frequency; the gas target has extremely high recycling rate by continuously replenishing gas. Therefore, the method has of high operating repetition frequency, high stability, low cost, small size and compactness, and strong practicability.

The ultra-intense near-single-cycle mid-infrared pulse generated in the present invention cannot be achieved by a traditional optical device at present. The laser plasma optical device of the present invention has potential wide application value for basic scientific research, medical and industrial application etc.

We claim:
1. A laser plasma optical device, comprising:
  a laser system for outputting driving light pulses and signal light pulses;
  a vacuum target chamber for providing a vacuum environment for interaction of laser and matter;

a gas target generating device disposed in the vacuum target chamber, the gas target generating device being used for generating gas and forming a plasma channel target along a propagation direction of a driving light pulse by a laser pre-pulse irradiation or by a high-pressure ionized gas; and a focusing element disposed in the vacuum target chamber, wherein the driving light pulse is focused onto the plasma channel target by the focusing element to generate a density-modulated plasma wake;

after a predetermined delay time T, the signal light pulse is focused onto a leading edge region of a second plasma density cavitation bubble of the density-modulated plasma wake through the focusing element, so that frequency of the signal light pulse is red-shifted to generate a near-single-cycle mid-infrared pulse with relativistic intensity and single-pulse energy up to multi-millijoule.

2. The laser plasma optical device of claim 1, wherein the plasma channel target has a density rising radial density gradient distribution in a radial direction of a channel and a substantially uniform axial density distribution in an axial direction of the channel.

3. The laser plasma optical device of claim 1, wherein the leading edge region is within most front end or a first half region of the second plasma cavitation bubble of the plasma wake.

4. The laser plasma optical device of claim 1, wherein a beam waist radius where the driving light pulse and the signal light pulse are focused on the plasma target is 5-30 micrometers.

5. The laser plasma optical device of claim 1, wherein the predetermined delay time T is adjusted in a range of tens of femtoseconds.

6. The laser plasma optical device of claim 1, wherein the peak power of the driving light pulse is 1-20 terawatts.

7. The laser plasma optical device of claim 1, wherein the peak power of the signal light pulse is 0.1-15 terawatts.

8. The laser plasma optical device of claim 1, wherein the gas target generating device is a controllable high pressure gas nozzle device or capillary channel device.

9. The laser plasma optical device of claim 1, wherein the mid-infrared pulse comprises one or more characteristics selected from the group consisting of (a) a peak intensity exceeding $10^{17}$ watts/cm$^2$; (b) a pulse width being short to near a single optical cycle at the half-height full width position of the light intensity; (c) total energy up to dozens of millijoules; (d) a central wavelength up to 5 micrometer, and the maximum cut-off wavelength up to 10 micrometer; and (e) a controllable carrier phase.

10. A method for generating a near-single-cycle mid-infrared pulse with relativistic intensity and single-pulse energy up to multi-millijoule, comprising
(a) providing a gas target to generate a plasma channel target through laser pre-pulse irradiation or high-pressure ionization of the gas target;
(b) providing a driving light pulse to focus onto the gas target or the plasma channel target formed by the gas target in step (a) to generate a density-modulated plasma wake; and
(c) after a predetermined delay time T, providing a signal light pulse to focus onto a leading edge region of a second plasma density cavitation bubble of the plasma wake in step (b) to red-shift a frequency of the signal light pulse to generate a near-single-cycle mid-infrared pulse with relativistic intensity and single-pulse energy up to multi-millijoule.

* * * * *